US011290158B2

(12) United States Patent
Karjalainen et al.

(10) Patent No.: US 11,290,158 B2
(45) Date of Patent: Mar. 29, 2022

(54) SIGNALING RX/TX BEAMFORMING LINKAGE FOR MIMO SYSTEMS (71) Applicant: Nokia Technologies Oy, Espoo (FI)

(72) Inventors: Juha Pekka Karjalainen, Oulu (FI); Sami-Jukka Hakola, Kempele (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 531 days.

(21) Appl. No.: 16/319,372

(22) PCT Filed: Jul. 20, 2017

(86) PCT No.: PCT/FI2017/050548
§ 371 (c)(1),
(2) Date: Jan. 21, 2019

(87) PCT Pub. No.: WO2018/020078
PCT Pub. Date: Feb. 1, 2018

(65) Prior Publication Data
US 2021/0281297 A1 Sep. 9, 2021

Related U.S. Application Data (60) Provisional application No. 62/366,769, filed on Jul. 26, 2016.

(51) Int. Cl.
*H04B 7/02* (2018.01)
*H04B 7/0417* (2017.01)
(52) U.S. Cl.
CPC .................. *H04B 7/0421* (2013.01)
(58) Field of Classification Search
CPC .................................................. H04B 7/0421
(Continued)

(56) References Cited

U.S. PATENT DOCUMENTS 9,942,785 B2 * 4/2018 Gao ...................... H04W 24/08
2013/0064129 A1 * 3/2013 Koivisto ................ H04B 7/065
370/252
(Continued)

FOREIGN PATENT DOCUMENTS

WO WO 2011/150549 A1 12/2011
WO WO 2014/117352 A1 8/2014
(Continued)

OTHER PUBLICATIONS

International Standard, ISO/IEC/IEEE 8 802-11, "Information technology—Telecommunications and information exchange between systems—Local and metropolitan area networks—Specific requirements; Part 11: Wireless LAN medium access Control (MAC) and physical layer (PHY) specifications, Amendment 3: Enhancements for very high throughput in the 60 GHz band (adoption of IEEE Std 802.11ad-2012)" 31 pgs.

*Primary Examiner* — Don N Vo
(74) *Attorney, Agent, or Firm* — Harrington & Smith (57) ABSTRACT The specification and drawings present methods and apparatuses for feedback signaling for beamforming purposes in a multiple input-multiple output (MIMO) radio environment. According to an embodiment of the invention, a mobile device is configured to measure an integer number P of different beam groups, each group representing one or more transmit beams and each group corresponding to one or more antenna ports at the mobile device. The mobile device is triggered according to the configuration to provide feedback. The radio access node transmits reference signals on each of the transmit beams across all of the groups for measurement by the mobile device and receives the triggered feedback including, for each of the different beam groups, at least one best match between a transmit beam of
(Continued)

the respective group and a corresponding antenna port and an indication of measurement results for the best match.

20 Claims, 7 Drawing Sheets

(58) Field of Classification Search
USPC .......................................................... 375/267
See application file for complete search history.

(56) References Cited

U.S. PATENT DOCUMENTS

| | | |
|---|---|---|
| 2014/0198681 A1 | 7/2014 | Jung et al. .................... 370/252 |
| 2015/0257073 A1 | 9/2015 | Park et al. |
| 2016/0285660 A1 | 9/2016 | Frenne et al. |

FOREIGN PATENT DOCUMENTS

| | | |
|---|---|---|
| WO | WO 2014/168319 A1 | 10/2014 |
| WO | WO 2017/067138 A1 | 4/2017 |

* cited by examiner

552: receive a configuration to measure (up to) $P$ different beam groups, each group representing one or more transmit beams and each group corresponding to one or more antenna ports at the UE 554: receive a trigger to provide feedback according to the configuration 556: measure reference signals on each of the transmit beams across all of the groups on the respectively corresponding one or more antenna ports 558: from the measuring, determine for each of the different beam groups at least one best match between a transmit beam of the respective group and a corresponding antenna port 560: transmit the triggered feedback comprising the at least one best match for each of the different beam groups and an indication of the measuring that resulted in the best match across all of the groups on the respectively corresponding one or more antenna ports

SIGNALING RX/TX BEAMFORMING LINKAGE FOR MIMO SYSTEMS

CROSS REFERENCE TO RELATED APPLICATION

This patent application is a U.S. National Stage application of International Patent Application Number PCT/FI2017/050548 filed Jul. 20, 2017 and claims priority to U.S. provisional application 62/366,769 filed Jul. 26, 2016, which are hereby incorporated by reference in their entireties.

TECHNOLOGICAL FIELD

The described invention relates to wireless communications, and more particularly to feedback signaling for beamforming purposes in a multiple input-multiple output (MIMO) radio environment such as for example the massive MIMO arrays projected for 5G radio access technology (RAT) systems being developed to operate in the centimeter- and millimeter-wave (mmWave) spectrum.

BACKGROUND

Wireless radio access technologies continue to be improved to handle increased data volumes and larger numbers of subscribers. The 3GPP organization is developing 5th Generation (5G) wireless networks to handle peak data rates of the order of ~10 Gbps (gigabits per second) while still satisfying ultra-low latency requirements in existence for certain 4G applications. 5G intends to utilize radio spectrum on the order of GHz or more in the millimeter-wave (mmWave) band; and also to support massive MIMO (m-MIMO). M-MIMO systems are characterized by a much larger number of antennas as compared to 4G systems, as well as finer beamforming resolution and a higher antenna gain.

Standardization work for 5G has started in the Third Generation partnership project (3GPP) which has issued a study item in RAN1. Further, some form of a 5G radio access technology specification has been the subject of attention in the pre-5G standards which are targeting the early deployment of envisioned 5G technologies to alleviate increasing data traffic already before globally available 3GPP compliant 5G systems. Physical layer specifications for these pre-5G systems are already available and in a very advanced state. The main backbone of the system is a hybrid multi antenna deployment at the base station (BS). In addition, the user equipment (UE) is able to perform also analog/RF beamforming.

Notably, at these very high frequency bands 5G systems should provide a radio environment where UE-side beamforming can significantly improve the link budget. But these same high frequencies are subject to much greater signal power attenuation as a function of distance and diffraction loss. To compensate increased path loss between transmitter and receiver both BS and UE may operate using narrow RF beams. That results in behaviour, not typical to lower band operation, where the radio link between the BS and UE can be broken when the user turns his hand or body to block the signal path both the BS and UE side beam are pointing to.

More specifically, to achieve sufficient coverage and capacity in a cellular network, large propagation/path loss of the radio channel at high carrier frequencies such as 28 GHz need to be compensated by introducing directive, transmission and reception in the form of beamforming such as by using large scale antenna arrays. As a result of this, relatively large antenna array gains at both the base station/eNB and the UE sides can be achieved to compensate for propagation loss as well as for losses due to rain and even oxygen absorption. As an example, in 5G systems a BS with 64 antenna elements can have an antenna gain of 18 dB while a UE with 8 antenna elements can have an antenna gain of 9 dB.

To exploit the full merit of large scale antenna arrays such as phased antenna array technology, it would be advantageous to dynamically adjust the directivity at the transmitter and at the receiver. Such adjustments can be according to a deployment scenario and according to potential changes in a radio link between transmitter and receiver. In practice, especially in cellular networks with multiple base stations and users, this may lead to an excessive amount of system overheads related to beamformer training, beam tracking and beam switching at the mobile device and associated signaling needs. Embodiments of these teachings provide the dynamic adjustments as mentioned above but with an efficient control signaling budget.

Some teachings that may be relevant to the subject matter herein may be seen at specification IEEE 802.11ad section 9.35, particularly its employment of a one-sided beam search using a beamforming codebook so as to establish the initial alignment between large-sized array antennas.

These aspects and others are detailed further below with particularity.

DETAILED DESCRIPTION

Example embodiments of these teachings provide feedback signalling so as to enable transmitter and receiver beam management for base station and mobile devices, which are preferably equipped with analog/hybrid antenna array architectures. As will be further detailed below, efficiency in this feedback signaling arises from grouping the transmitter beams that the receiver measures and reports upon. The embodiments below are in the context of a 5G radio system but this is only an example radio environment and not a limit to the broader teachings herein.

Figure 1:
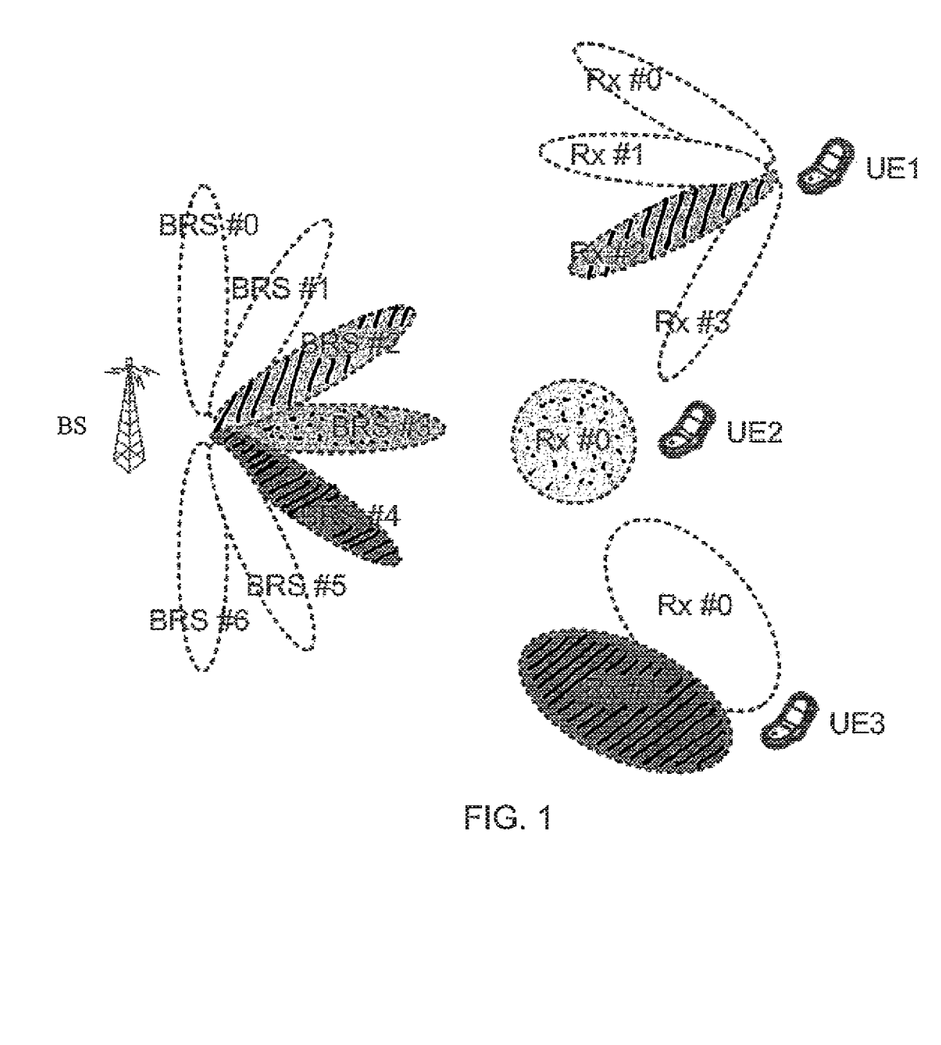
FIG. 1 is a plan view of one base station and three user equipments and depicting transmit beams of the base station in spatial relation to receive beams of the different user equipments to illustrate transmit/receive beam linkages that underlie the description herein.

FIG. 1 is a plan view of one base station (BS) and three user equipments (UEs) which depicts BS Tx beams which are matched with UEs having different Rx beam resolutions. In practice the individual UE will 'sweep' its Rx beams across the various BS Tx beams to find a best match or the best matches, as further described below. For the case of a unidirectional UE shown in FIG. 1 as UE2, this UE only needs to find the strongest Tx beam from the BS since it has only a single choice for its own Rx beam in the beam matching. Matching Tx and Rx beams are illustrated in FIG. 1 by similar shading. In the FIG. 1 example UE1 operates with 4 Rx beams and matches its own Rx beam #2 with the BS beam #2. The UE2 shown at FIG. 1 is using an omnidirectional antenna RX #0 for which the best DL beam from the BS is beam #3. The UE3 of FIG. 1 is operating only 2 Rx beams and matches its own beam #1 with the BS beam #4. While UE3 can receive a signal from this BS on its Rx beam #0 from the BS's Tx beam #4 for example, this would not be the best match. Similarly, UE3 can receive a signal from this BS on its Rx beam #1 from the BS's Tx beam #3 and #5 for example, but neither of these are the best match.

In the FIG. 1 example and in the description below, the individual UEs are to identify a given Tx beam of the BS by means of a beam reference signal (BRS) that is different per Tx beam. FIG. 1 illustrates this concept in that each of the 6 Tx beams of the BS are identified by a different BRS. The index for these different BRSs can be considered as the index for the Tx beam on which that given BRS was sent. The UE finds the best match of the base station's Tx beam and its own Rx beam, identifies that the Tx beam of this best match is associated with BRS #x (the BRS being what the UE measures in order to decide that best match), uses an association table stored in its local memory to find the Tx beam index associated with that BRS #x, and reports to the BS the index of that Tx beam in its feedback signaling as detailed further below. The association table may be provided to the UEs by the BS itself, for example in system or other broadcast information or in dedicated RRC signaling, prior to the beam matching described herein.

With the above overview of Tx and Rx beam matching, there may be certain considerations concerning linkage between DL and UL beams.

For instance, the time and frequency resources that can be used by the UE to report beam status information (BSI) which consists of beam index (BI) and corresponding beam quality information (BQI) may be decided by the BS. The UE may determine the BI and BQI based on BRS measurement. In addition, a UE may update beam indexes (BIs) with highest BQIs based on periodic measurements. The beam status information (BSI) at a UE is reported via uplink, where BSI consists of BI and BQI. The uplink resources for beam information reporting are configured by BS.

It is known that the BS can control the aperiodic time and frequency resources on which the UE reports its Beam Refinement Information (BRI) such as Beam Refinement Reference Signal Resource Index (BRRS RI) and BRRS Reference power (RP). Each BRI report corresponds to a given Beam Refinement (BR) process, and a UE can be configured with one or more BR processes each associated with a set of BRRS resources that can span one or two OFDM symbols. Similar to conventional PDCCH/PUSCH mapping, when a UE decodes in subframe n a DCI that indicates it should send a BRI report for a given BR process the UE will send it in the allocated uplink resource within subframe n+k. This DCI can trigger the BRI report using only 2 bits. Typically a given UE will receive only one request for a BR report in a given subframe, and is expected to feedback in that report the BRRS-RP corresponding to some predetermined number $k_{BRRS}$ of the best BRRS resources it measures.

BRI feedback may look like as follows
    For each of the best $k_{BRRS}$ BRRS resources:
        A UE may report a wideband BRRS-RP value and a BRRS-RI value
        The reported BRRS-RP value is calculated conditioned on the reported BRRS-RI.

Relevant to the teachings herein, the above concepts being considered as 5G requirements can be summarized as the mobile devices is to provide a beam index related feedback in at least two parts: beam index (BI) feedback which is to be based on the measurements of the beam reference signal (BRS); and beam refinement information (BRI) feedback which is to be based on the measurements of the beam refinement reference signal (BRRS). The BRI feedback is to consist of a BRRS Resource Index (BRRS-RI), and a BRRS reference power (BRRS-RP). The mobile device is to report the best $k_{BRRS}$ BRRS resources which it maps to, where $k_{BRRS}$ is a positive integer.

Embodiments of these teachings utilize the above signalling structure, excepting the dedicated reference signals which in the relevant 5G specifications are the BRRSs, but in a very efficient way respecting the signalling overhead. Eliminating, or at least minimizing the use of the dedicated reference signals BRRSs aids in reducing the signalling overhead as well as latency in implementing a process for beam matching according to these teachings. More specifically, embodiments of these teachings that are further detailed below by example provide a way of signalling the UE Rx/Tx beamforming linkage with respect to the transmitted DL beams, and reduce the signaling overhead by grouping the DL beams into sets of beams using the same UE Rx beamforming in the mobile device. The UEs then signal to the base station/transmitter of the grouped transmitter beams the UE's measurements (for example, RSRP and/or RSRQ values) of the corresponding beams. In one embodiment, the DL RS may be a BRS as in the proposed 5G requirements above, or alternatively it may be demodulation reference symbols (DMRS) used for control channel decoding and/or demodulation reference symbols used for data decoding.

Figure 2:
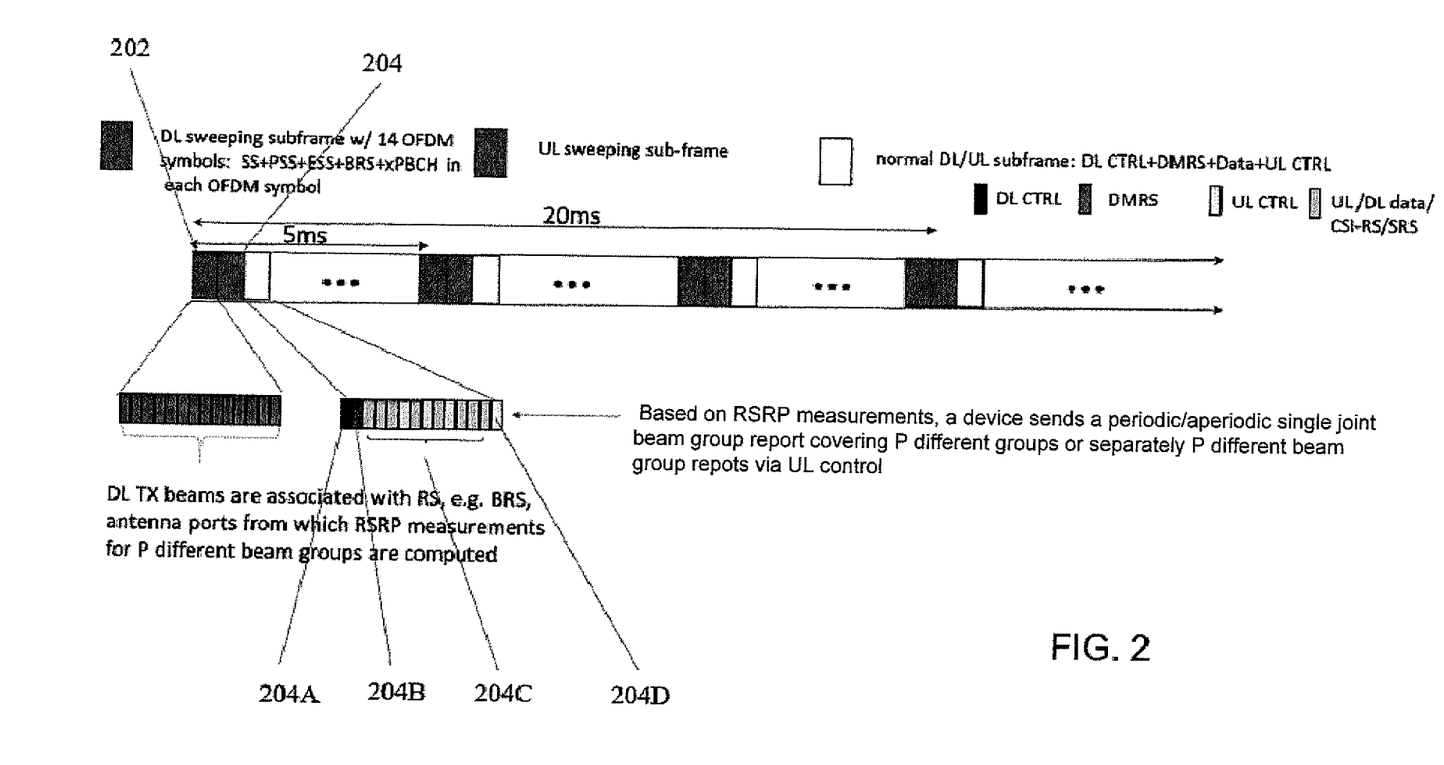
FIG. 2 illustrates a radio frame structure with different subframes dedicated to different specific signaling, including the feedback signaling describe by example below, according to one particular but non-limiting embodiment to implement the teachings herein.

The BS will be sending RSs such as BRSs which the UEs measure and provide feedback. FIG. 2 illustrates an overview of an example radio frame structure with example positions of relevant downlink and uplink signals and channels. Subdivisions in the overall frame are sub-frames and the insets below the frame itself illustrate the different OFDM symbol positions of a given subframe (there are 14 OFDM symbols per subframe in this example).

As shown, beam group measurements are performed at the UE from antenna ports associated with a configured RS, for example a configured BRS. In this example the first illustrated subframe is reserved for beam measurement by the UE and is referred to herein as a DL sweeping subframe 202. In this example each and every OFDM symbol in the DL sweeping subframe 202 carries the secondary synchronization signal (SSS), the primary synchronization signal (PSS), the extended synchronization signal (ESS), the BRS and the physical broadcast channel (PBCH). PSS may be used for symbol synchronization, ESS for subframe synchronization and SSS for frame synchronization. The next subframe is an UL sweeping subframe 204 in which for certain embodiments the UE may transmit on its beams for measurement and matching by the BS, as a mirror image of the measurement of the BS's DL/Tx beams by the UE as described herein.

After the sweeping subframe 202 (or 202 and 204 if both DL and UL sweeping subframes are used in a given deployment), the mobile device sends its feedback report via uplink control signaling, such as for example an xPUCCH. This feedback report gives up to P different beam groups with the N-best logical beam indices (best matches within the group per UE beam) in conjunction with N-best RSRP/RSRQ levels in each group, For convenience the subframe in which the UE sends its feedback report is termed a feedback subframe 204, and FIG. 2 shows this feedback subframe 204 as having DL control signaling 204A in one OFDM position followed by a DMRS in the next OFDM position, followed by OFDM positions for data (and/or for carrying other conventional RSs such as channel state information reference signals CSI-RSs and/or sounding reference signals SRSs). The final OFDM position 204D in this feedback subframe 204 is where the feedback report according to these teachings is transmitted by the UE, for example the UE's BRI feedback sent in the xPUCCH as detailed immediately above.

Figure 3:
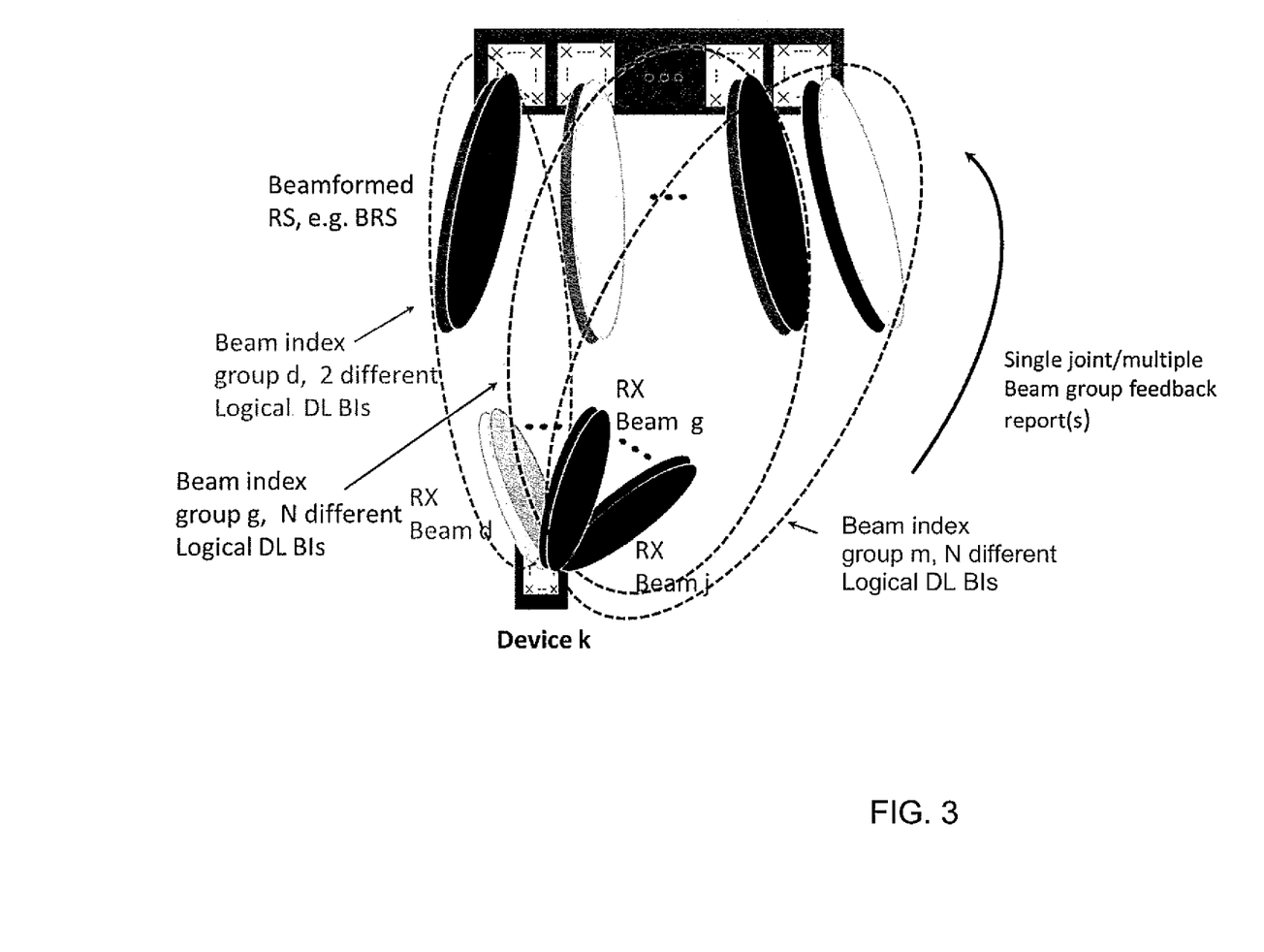
FIG. 3 is a plan view that is conceptually similar to FIG. 1 but showing multiple receive beams of only a single user device in spatial relation to multiple transmit beams of co-located transmit antennas, and illustrates one particular radio environment in which these teachings can be deployed to advantage.
Figure 4:
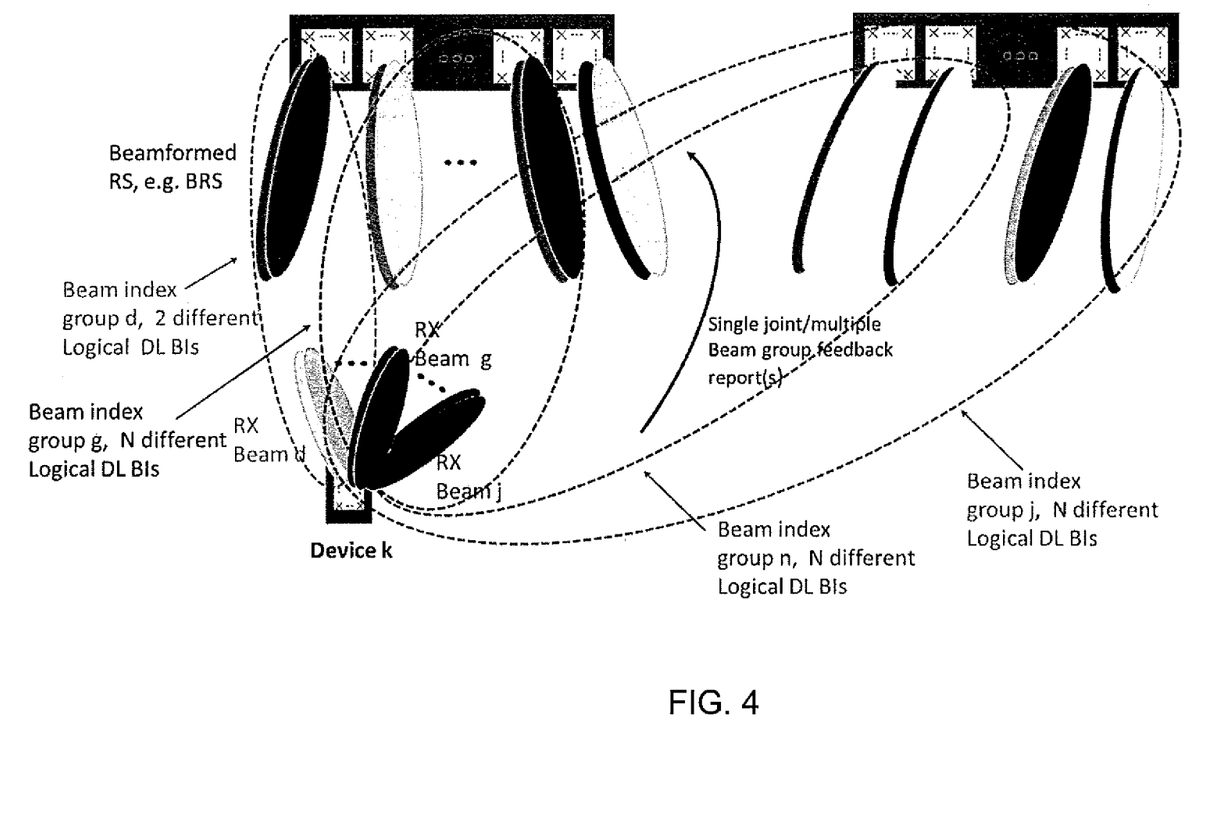
FIG. 4 is a plan view similar to FIG. 3 except that the multiple transmit beams are from non co-located transmit antennas, and illustrates another particular radio environment in which these teachings can be deployed to advantage.

The feedback signalling scheme according to certain embodiments of these teachings enhances the BS's awareness of different TX-RX beam combinations (as well as the UE's awareness) for both co-located and non co-located antenna deployments at the BS. FIG. 3 described further below illustrates an example of a co-located BS antenna deployment while FIG. 4 illustrates an example of a non co-located BS antenna deployment. This enhanced awareness enables a more efficient beam management as to beam training, tracking and switching as well as scheduling flexibility in terms of BS beams. As compared to the above-provided example, embodiments of these teachings at least minimizes and in some deployments avoids the usage of dedicated reference signals such as BRRS for beam tracking and switching purposes. This enables a more efficient operation of the radio system in terms of overheads and latencies.

As described below the feedback signalling facilitates a transparent way for a base station to configure and manage different UE/mobile device specific TX-RX beam combinations without needing to explicitly signal RX antenna port indices to a base station; this is true in both co-located and non co-located BS antenna deployments.

According to an example embodiment, initially the BS/network configures a given UE/mobile device with an integer value for a parameter P. The BS/network can configure the value for P with higher layer signaling. The value for P indicates the number of different beam index group measurements the UE is to make when tasked to do so by the BS/network, until the BS/network configures a new value for P for this UE. Alternatively, P is defined as a max value. Each of these P different beam index group measurements correspond to different RX beam space configurations, defined by different RX antenna port and beam configurations at the mobile device. The UE will provide beam feedback to the BS for each of these P beam index groups.

The base station may separately configure for a mobile device the subset of the UE's antenna ports to be associated with the reference signals that are to be measured and reported. The BS may further configure the UE, such as via dedicated signaling with a value for another parameter N which represents the number of DL TX logical beam indices associated with reference signal (BRS) antenna ports that the UE will include in its beam index group feedback. In this regard the value for N is applied per P beam index group. Preferably the value for N is device specific and configured via higher layer signaling, but alternatively the value for N may be fixed in specifications and depend on the number of Rx antennas the UE is currently putting into use with this BS.

The BS transmits the different RSs (such as BRSs) on its different beams, as described by example for FIG. 2. The UE/mobile device performs P different beam index group measurements from reference signals associated with beam measurements/CSI computation/demodulation, for example the BRSs, These reference signals may be used for user-plane (U-plane) and/or for control-plane (C-plane) operations.

For each of these P different beam index groups, the UE will include in its beam index group feedback report (or reports if the feedback is parsed as described below) only the N-best DL TX logical beam indices associated with the BRS antenna ports. In an embodiment the value for N remains the same regardless of whether the BS's antennas/beams being measured and reported by this particular UE are co-located or non co-located. The UE determines the N-best logical DL beam indices according to measurements on the aforementioned antenna ports. Thus the UE's feedback for a given iteration of beam measurement and matching will indicate to the BS, for each different one of the P beam index groups, the N-best DL TX logical beam indices associated with the BRS antenna ports.

The beam index group feedback can be sent by the UE periodically or on an aperiodic basis depending on the specific deployment. Or alternatively the base station has the freedom to configure the feedback reporting mode to be either periodic or aperiodic.

In either case, the beam index group feedback can be sent as a single joint beam index group report covering all P different beam index groups, or it can be sent as P separate beam index group reports via uplink control or data channels.

In one non-limiting example of periodic feedback reporting, the UE/mobile device sends a periodic feedback report via uplink control (for example, via the xPUCCH), in subframe n+k upon decoding in subframe n regarding to P different beam index groups in conjunction with N-best TX beam indices. This periodic feedback report also includes the corresponding quantized RSRP and/or RSRQ levels associated with each beam index set.

In one non-limiting example of aperiodic feedback reporting, the UE/mobile device sends an aperiodic feedback report multiplexed with data (for example, multiplexed in the xPUSCH), regarding to P different beam index sets in conjunction with the N-best TX beam indices. This aperiodic feedback report also includes the corresponding quantized RSRP and/or RSRQ levels associated with each beam index group.

In another non-limiting example of aperiodic feedback reporting, the UE/mobile device sends an aperiodic feedback report as a part of data (for example in the xPUSCH), in a media access control (MAC) message to the base station on P different beam index sets, in conjunction with the N-best TX beam indices. As with the other embodiments above this feedback report also includes the corresponding quantized RSRP and/or RSRQ levels associated with each beam index set.

As can be seen from the above description the feedback signalling scheme according to embodiments of these teachings can be based on periodic and/or aperiodic reference signals, and enables efficient TX and RX beam management in a wireless system for co-located as well as non co-located BS antenna deployments. The feedback signaling scheme described herein captures several beam index group measurements from transmitted reference signals (for example, transmitted BRSs), and enables a mobile device to send single or multiple feedback reports via uplink control or data channels.

For the below description of FIGS. 3-4, assume the following beam index groupings are mutually understood by both the UE/mobile device and the base station. This mutual understanding may be due to a signaling exchange or common knowledge of radio access technology specifications that set forth such a grouping.

| Beam Index Group | TX beams |
| --- | --- |
| group d | Beam #1, Beam #2 |
| group g | Beam #3, Beam #4, Beam #5, Beam #6 |
| group j | Beam #9, Beam #10, Beam #11, Beam #12 Beam #13, Beam #14, Beam #15, Beam #16 |
| group m | Beam #5, Beam #6, Beam #7, Beam #8 |
| group n | Beam #9, Beam #10, Beam #11, Beam #12 |

FIG. 3 represents a radio environment in which the base station has only co-located antennas, and numbering these left to right corresponds to beam #1 through beam #8. In this example the BS has configured the UE with P=3, specifically beam index groups d, g, and m which define the specific beams per the table above. The UE has 6 Rx beams. Using the dashed line correspondences shown at FIG. 3, there are two RX beams (or more precisely two RX antenna ports) associated with Tx beam group d, two different Rx antenna ports are associated with Tx beam group g, and the remaining two Rx antenna ports are associated with Tx beam group m. Two Rx antenna ports per group may refer to polarization diversity applied at the UE, i.e. UE always point two ports of different polarizations to the same direction. If we number the UE's six antenna ports left to right as port #1 through port #6, the UE at FIG. 3 is therefore configured to measure the N-best DL TX logical beam indices associated with the indicated BRS antenna ports.

| Beam Index Group | TX beams | RX beams |
| --- | --- | --- |
| group d | Beam #1, Beam #2 | Port #1, Port #2 |
| group g | Beam #3, Beam #4, Beam #5, Beam #6 | Port #3, Port #4 |
| group m | Beam #5, Beam #6, Beam #7, Beam #8 | Port #5, Port #6 |

For purposes of this example, if we assume the value of N=2, the UE's beam index feedback for FIG. 3 may then be:

| Beam Index Group | N = 2 best DL TX logical beams | Associated with |
| --- | --- | --- |
| group d | Beam #1, Beam #2 | RX beam d (RX Port #1, RX Port #2) |
| group g | Beam #4, Beam #6 | RX beam g (RX Port #3, RX Port #4) |
| group m | Beam #5, Beam #7 | RX beam j (RX Port #5, RX Port #6) |

This beam index feedback report will also include indications of the UE's measurements of the RSRP and/or RSRQ levels associated with each beam index group, as noted above.

The example at FIG. 4 is similar except in this example the TX beams from the BS are non co-located. Notice that beam index group j corresponds to 4 RX antenna ports at the UE. This simply demonstrates that different antenna groups can correspond to different antenna ports, and different numbers of antenna ports, at the UE. In an embodiment the Rx antenna ports at the UE can be grouped as shown at FIGS. 3-4 to further simply signaling from the BS to inform the UE which RX ports are to correspond to which TX antenna groups.

Figure 5A:
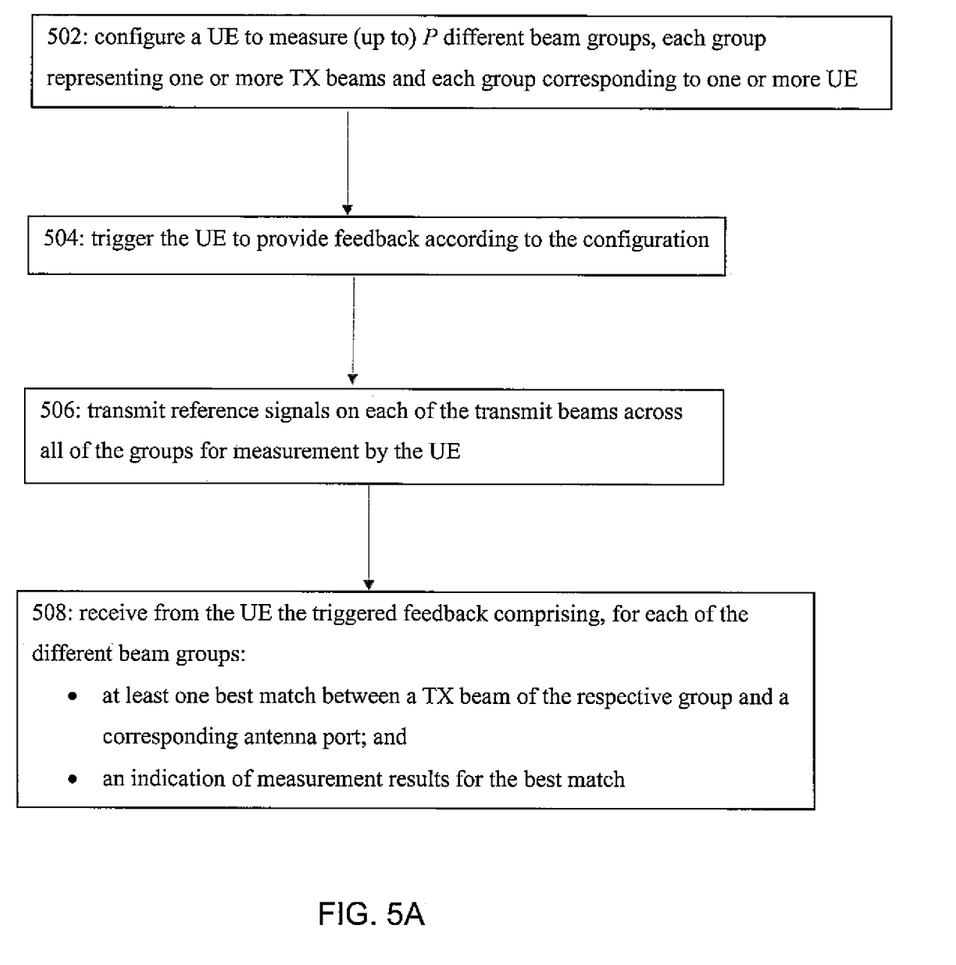
FIGS. 5A-B are process flow diagrams summarizing certain aspects of the invention from the perspective of a network radio access node/base station and of a user equipment/mobile device, respectively.

FIG. 5A is a flow diagram from the perspective of the network, more particularly from the perspective of the network radio access node such as the base station in the above examples, that summarizes some of the above features described more particularly above. At block 502 the network configures a mobile device/UE to measure an integer number P of different beam groups (or the UE can measure up to P groups if P is given as the maximum), each group representing one or more transmit beams and each group corresponding to one or more antenna ports at the mobile device/UE. Then at step 504 the network triggers the mobile device to provide feedback according to the configuration. Triggering was not discussed above in much detail; in one example of aperiodic triggering the trigger can be in an xPDCCH and in an example of periodic triggering the triggering can be inherent in configuring the mobile device/UE with the P different beam groups where the periodic trigger is sent once and the feedback reporting period is mutually understood. At block 506 of FIG. 5A the network transmits reference signals on each of the transmit beams across all of the groups for measurement by the mobile device; and finally at block 508 the network receives from the mobile device/UE the triggered feedback. As detailed above, this feedback includes, for each of the different beam groups, at least one best match between a transmit beam of the respective group and a corresponding antenna port and an indication of measurement results for the best match. In the above examples this feedback report had exactly N best matches per beam group.

In one specific embodiment the reference signals are beam reference signals. For the case the triggering at block 504 is periodic, the triggered feedback may be received in a subframe that maps from a subframe in which the reference signals were transmitted. In embodiments where this triggering is aperiodic the triggered feedback may be received in a physical uplink shared channel xPUSCH multiplexed with data, and/or it may be received in a media access control MAC message on a physical uplink shared channel xPUSCH with data.

In a further specific embodiment the network may additionally configure the mobile device with an integer value for N that defines how many best-matches are to be reported for each of the P different beam groups in the triggered feedback. In this case the received feedback would then have the N best matches per group.

To ease the signaling overhead, in one embodiment each of the P different beam groups is associated with a group index, and configuring the mobile device at step 502 comprises signaling to the mobile device the respectively associated group indices of the P different beam groups.

Any or all of these aspects of the invention with respect to FIG. 5A can be embodied as a computer readable memory tangibly storing a computer program that when executed causes a host network radio access node to perform the actions described above for FIG. 5A.

These teachings can further be embodied as an apparatus, such as a network access node/base station or components thereof, comprising at least one processor and at least one memory storing a computer program. In this embodiment the at least one processor is configured with the at least one memory and the computer program to cause the apparatus to perform the actions described above for FIG. 5A.

Figure 5B:
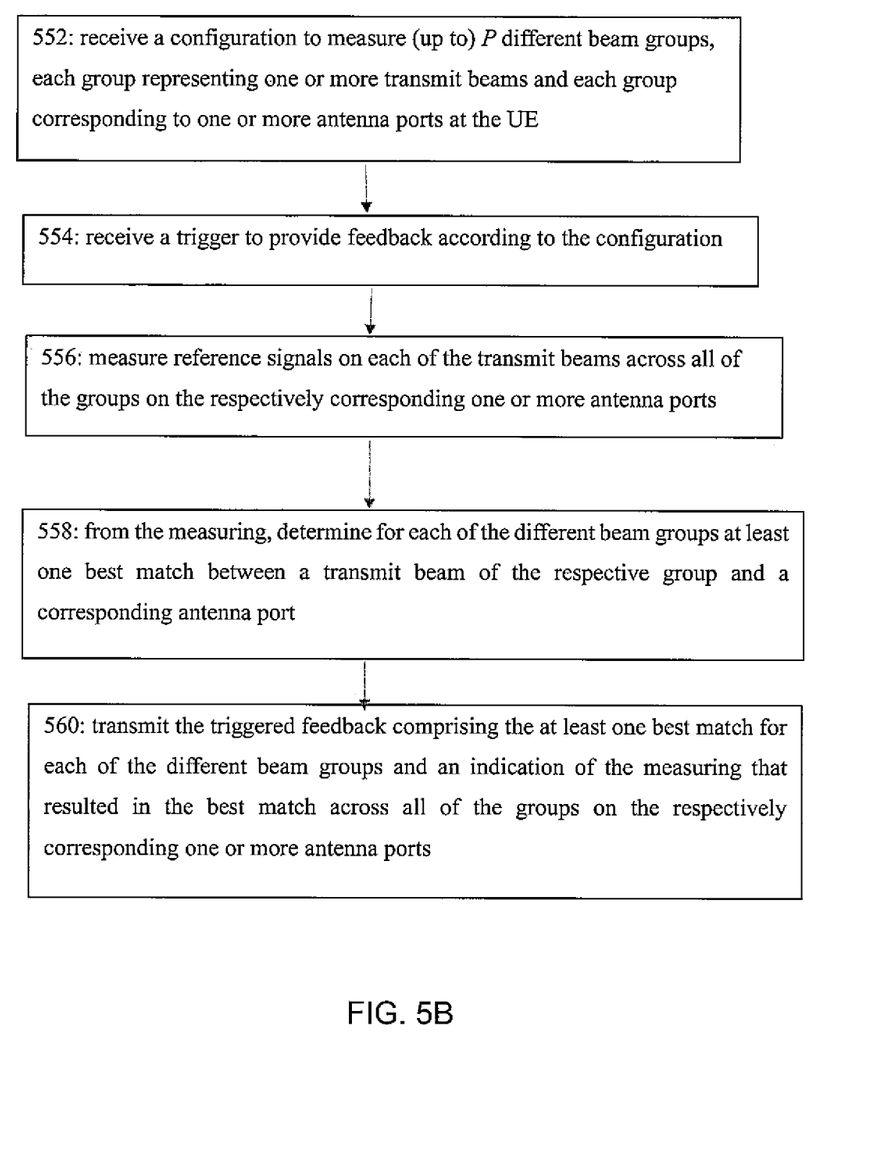

FIG. 5B is a flow diagram of certain aspects of the invention from the perspective of the mobile device/UE that summarizes some of the above features. At block 552 the mobile device/UE receives from a radio network a configuration to measure an integer number (up to) P of different beam groups, each group representing one or more transmit beams and each group corresponding to one or more antenna ports at the mobile device. At block 554, which may come before, after or with the configuration of block 552, the mobile device/UE receives from the network a trigger to provide feedback according to the configuration. Some example triggers are described above with respect to FIG. 5A. The mobile device/UE at block 556 measures reference signals on each of the transmit beams across all of the groups on the respectively corresponding one or more antenna ports. From the measuring at block 556, the mobile device/UE determines at block 558 for each of the different beam groups at least one best match between a transmit beam of the respective group and a corresponding antenna port; and at block 560 it transmits to the network the triggered feedback. As above, this triggered feedback includes the at least one best match for each of the different beam groups, and also an indication of the measuring that resulted in the best match.

In the above examples the reference signals were specifically beam reference signals.

In a specific example the trigger of block 554 is to provide periodic feedback and the triggered feedback is transmitted to the network in a subframe that maps from a subframe in which the reference signals that were measured were received. In another example that trigger is to provide aperiodic feedback and the triggered feedback is transmitted to the network in a physical uplink shared channel multiplexed with data. In yet a further example that trigger is also to provide aperiodic feedback but in this case the triggered feedback is transmitted to the network in a media access control message on a physical uplink shared channel with data.

In another particular embodiment the mobile device/UE receives from the radio network a configuration for an integer value for N that defines how many best-matches are to be reported in the triggered feedback for each of the P different beam groups in the triggered feedback.

In a still further particular embodiment, each of the P different beam groups is associated with a group index, and the configuration to measure at block 552 identifies the P different beam groups via their respectively associated group indices. The above examples had the mobile device/UE performing the method according to FIG. 5B while operating with a 5G mmWave radio access technology, but this is a non-limiting embodiment as these teachings can be quite advantageous in many m-MIMO types of radio environments.

Any or all of these aspects of the invention with respect to FIG. 5B can be embodied as a computer readable memory tangibly storing a computer program that when executed causes a host mobile device to perform the actions described above for FIG. 5B.

These teachings can further be embodied as an apparatus, such as a mobile device/UE or components thereof, comprising at least one processor and at least one memory storing a computer program. In this embodiment the at least one processor is configured with the at least one memory and the computer program to cause the apparatus to perform the actions described above for FIG. 5B.

In a specific embodiment a default TX beam group is defined for connection between BS and UE. Control plane connection is handled via the default TX beam group; i.e., when receiving downlink control channel from BS, the UE may always assume default TX beam group and thus the UE can configure its RX beam accordingly. The default TX beam group can be changed and modified, e.g. utilizing above described methods to determine best groups by the BS and configured via BS-UE signaling. Via downlink control channel (used to signal scheduling grant for both downlink and uplink) transmitted using TX beam(s) belonging to the default group, the BS may signal the UE the used TX beam group for the actual data transmission (correspondingly for uplink data transmission the RX beam group at BS) and the UE can switch to corresponding RX beam to receive data. The BS can signal only group id and not actual TX beam(s) because UE only needs to know which RX beam to use.

Each of FIGS. 5A-B themselves can be considered as an algorithm, and more generally represents steps of a method, and/or certain code segments of software stored on a computer readable memory or memory device that embody the respective FIG. 5A-B algorithm for implementing these teachings from the perspective of that respective device (base station or similar radio network access node, or UE). In this regard the invention may be embodied as a non-transitory program storage device readable by a machine such as for example one or more processors of a radio network access node or UE, where the storage device tangibly embodies a program of instructions executable by the machine for performing operations such as those shown at FIGS. 5A-B and detailed above.

Figure 6:
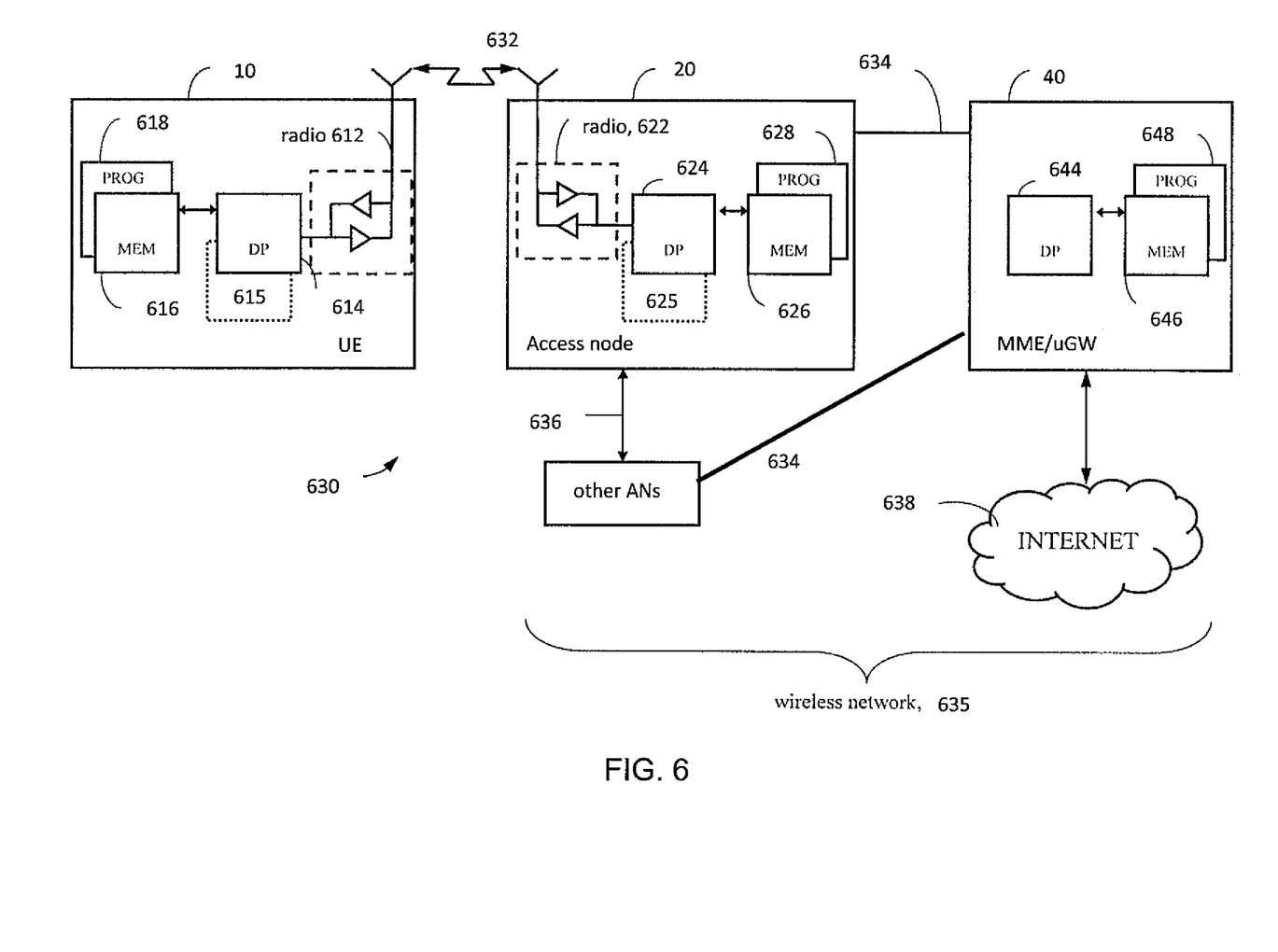
FIG. 6 is a diagram illustrating some components of a radio network access node/base station and a UE/mobile device, each of which are suitable for practicing various aspects of the invention.

FIG. 6 is a high level diagram illustrating some relevant components of various communication entities that may implement various portions of these teachings, including a base station identified generally as a radio network access node 20, a mobility management entity (MME) which may also be co-located with a user-plane gateway (uGW) 40, and a user equipment (UE) 10. In the wireless system 630 of FIG. 6 a communications network 635 is adapted for communication over a wireless link 632 with an apparatus, such as a mobile communication device which may be referred to as a UE 10, via a radio network access node 20. The network 635 may include a MME/Serving-GW 40 that provides connectivity with other and/or broader networks such as a publicly switched telephone network and/or a data communications network (e.g., the internet 638).

The UE 10 includes a controller, such as a computer or a data processor (DP) 614 (or multiple ones of them), a computer-readable memory medium embodied as a memory (MEM) 616 (or more generally a non-transitory program storage device) that stores a program of computer instructions (PROG) 618, and a suitable wireless interface, such as radio frequency (RF) transceiver or more generically a radio 612, for bidirectional wireless communications with the radio network access node 20 via one or more antennas. In general terms the UE 10 can be considered a machine that reads the MEM/non-transitory program storage device and that executes the computer program code or executable program of instructions stored thereon. While each entity of FIG. 6 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The radio network access node 20 also includes a controller, such as a computer or a data processor (DP) 624 (or multiple ones of them), a computer-readable memory medium embodied as a memory (MEM) 626 that stores a program of computer instructions (PROG) 628, and a suitable wireless interface, such as a RF transceiver or radio 622, for communication with the UE 10 via one or more antennas. The radio network access node 20 is coupled via a data/control path 634 to the MME 40. The path 634 may be implemented as an Si interface. The radio network access node 20 may also be coupled to other radio network access nodes via data/control path 636, which may be implemented as an X5 interface.

The MME 640 includes a controller, such as a computer or a data processor (DP) 644 (or multiple ones of them), a computer-readable memory medium embodied as a memory (MEM) 646 that stores a program of computer instructions (PROG) 648.

At least one of the PROGs 618, 628 is assumed to include program instructions that, when executed by the associated one or more DPs, enable the device to operate in accordance with exemplary embodiments of this invention. That is, various exemplary embodiments of this invention may be implemented at least in part by computer software executable by the DP 614 of the UE 10; and/or by the DP 624 of the radio network access node 20; and/or by hardware, or by a combination of software and hardware (and firmware).

For the purposes of describing various exemplary embodiments in accordance with this invention the UE 10 and the radio network access node 20 may also include dedicated processors 615 and 625 respectively.

The computer readable MEMs 616, 626 and 646 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 614, 624 and 644 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 612 and 622) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

Below are some acronyms used herein:
BRS Beam Reference Signal
BRRS Beam Refinement Reference Signal
BS Base Station (also eNB for enhanced nodeB)
DL Downlink
C-plane Control plane
MME Mobility Management Entity
m-MIMO Massive Multiple-Input Multiple Output
mmWave Millimeter wave
OFDM Orthogonal Frequency Division Multiplex
RS Reference signal
RSRP Reference Signal Received Power
RSRQ Reference Signal Received Quality
RX/Rx Receiver
TX/Tx Transmitter
UE User Equipment
uGW user-plane gateway UL Uplink
U-plane User plane
xPDCCH new Physical Downlink Control Channel (e.g., for 5G)
xPUCCH new Physical Uplink Control Channel (e.g., for 5G)

What is claimed is:

1. A radio access node comprising:
at least one processor and at least one memory including a computer program code, the at least one memory and the computer program code configured to, with the at least one processor, cause the radio access node at least to:
configure a mobile device to measure an integer number P of different beam groups, each group representing one or more transmit beams and each group corresponding to one or more antenna ports at the mobile device, wherein the one or more transmit beams per each beam group out of the different beam groups are grouped by using a same receive beamforming in the mobile device;
trigger the mobile device to provide feedback according to the configuration;
transmit reference signals on each of the transmit beams across all of the groups for measurement by the mobile device; and
receive from the mobile device the triggered feedback comprising, for each of the different beam groups, at least one best match between a transmit beam of the respective group and a corresponding antenna port and an indication of measurement results for the best match.

2. The radio access node according to claim 1, wherein the reference signals are beam reference signals.

3. The radio access node according to claim 1, wherein the triggering is periodic and the triggered feedback is received in a subframe that maps from a subframe in which the reference signals were transmitted.

4. The radio access node according to claim 1, wherein the triggering is aperiodic and the triggered feedback is received in a physical uplink shared channel multiplexed with data.

5. The radio access node according to claim 1, wherein the triggering is aperiodic and the triggered feedback is received in a media access control message on a physical uplink shared channel with data.

6. The radio access node according to claim 1, the at least one memory and the computer program code further configured to, with the at least one processor, cause the radio access node at least to:
configure the mobile device with an integer value for N that defines how many best-matches are to be reported for each of the P different beam groups in the triggered feedback, wherein the value of N for one or more of the P different beam groups is less than all of the beams in the individual ones of the one or more of the P different beam groups.

7. The radio access node according to claim 1, wherein each of the P different beam groups is associated with a group index, and wherein configuring the mobile device to measure the integer number P of different beam groups comprises signaling to the mobile device the respectively associated group indices of the P different beam groups.

8. A mobile device comprising:
at least one processor and at least one memory including a computer program code, the at least one memory and the computer program code configured to, with the at least one processor, cause the mobile device at least to:
receive from a radio network a configuration to measure an integer number P of different beam groups, each group representing one or more transmit beams and each group corresponding to one or more antenna ports at the mobile device, wherein the one or more transmit beams per each beam group out of the different beam groups are grouped by using a same receive beamforming in the mobile device;
receive from the network a trigger to provide feedback according to the configuration;
measure reference signals on each of the transmit beams across all of the groups on the respectively corresponding one or more antenna ports;
determine, based on the measured reference signals, for each of the different beam groups at least one best match between a transmit beam of the respective group and a corresponding antenna port; and
transmit to the network the triggered feedback comprising the at least one best match for each of the different beam groups and an indication of the measuring that resulted in the best match.

9. The mobile device according to claim 8, wherein the reference signals are beam reference signals.

10. The mobile device according to claim 8, wherein the trigger is to provide periodic feedback and the triggered feedback is transmitted to the network in a subframe that maps from a subframe in which the reference signals that were measured were received.

11. The mobile device according to claim 8, wherein the trigger is to provide aperiodic feedback and the triggered feedback is transmitted to the network in a physical uplink shared channel multiplexed with data.

12. The mobile device according to claim 8, wherein the trigger is to provide aperiodic feedback and the triggered feedback is transmitted to the network in a media access control message on a physical uplink shared channel with data.

13. The mobile device according to claim 8, the at least one memory and the computer program code further configured to, with the at least one processor, cause the mobile device at least to:
receive from the radio network a configuration for an integer value for N that defines how many best-matches are to be reported in the triggered feedback for each of the P different beam groups in the triggered feedback.

14. The mobile device according to claim 8, wherein each of the P different beam groups is associated with a group index, and the configuration to measure the integer number P of different beam groups identifies the P different beam groups via their respectively associated group indices.

15. The mobile device according to claim 8, wherein the at least one processor and the at least one memory including the computer program code, is further configured to operate with a 5G mmWave radio access technology.

16. A method comprising:
receiving at a mobile device from a radio network a configuration to measure an integer number P of different beam groups, each group representing one or more transmit beams and each group corresponding to one or more antenna ports at the mobile device, wherein the one or more transmit beams per each beam group out of the different beam groups are grouped by using a same receive beamforming in the mobile device;
receiving at the mobile device from the network a trigger to provide feedback according to the configuration;

measuring at the mobile device reference signals on each of the transmit beams across all of the groups on the respectively corresponding one or more antenna ports;

from the measuring, determining at the mobile device for each of the different beam groups at least one best match between a transmit beam of the respective group and a corresponding antenna port; and transmitting by the mobile device to the network the triggered feedback comprising the at least one best match for each of the different beam groups and an indication of the measuring that resulted in the best match.

17. The method according to claim 16, wherein the reference signals are beam reference signals.

18. The method according to claim 16, wherein at least one of:

the trigger is to provide periodic feedback and the triggered feedback is transmitted to the network in a subframe that maps from a subframe in which the reference signals that were measured were received;

the trigger is to provide aperiodic feedback and the triggered feedback is transmitted to the network in a physical uplink shared channel multiplexed with data; or the trigger is to provide aperiodic feedback and the triggered feedback is transmitted to the network in a media access control message on a physical uplink shared channel with data.

19. The method according to claim 16, further comprising:

receiving from the radio network a configuration for an integer value for N that defines how many best-matches are to be reported in the triggered feedback for each of the P different beam groups in the triggered feedback.

20. The method according to claim 16, wherein each of the P different beam groups is associated with a group index, and the configuration to measure the integer number P of different beam groups identifies the P different beam groups via their respectively associated group indices.

* * * * *